Inventor
Adolph Ronning
By Carlsen & Hagle
Attorneys

Patented Apr. 1, 1941

2,236,630

UNITED STATES PATENT OFFICE 2,236,630

CULTIVATOR

Adolph Ronning, Minneapolis, Minn.

Original application August 26, 1938, Serial No. 226,941. Divided and this application December 14, 1939, Serial No. 309,205

15 Claims. (Cl. 97—47)

This invention relates generally to improvements in implements for tilling and cultivating purposes and particularly to improvements in the construction and mountings for the actual tools used in such work.

The primary object of my invention is to provide a novel and advantageous tool structure and mounting by which the tool will be guided to its work in the earth but with freedom of certain vertical movement as may be required to yieldably depress the tool to the desired working depth, such resiliency being inherent in the tool mounting and allowing individual flexing where a gang of such tools are employed. Another object is to provide a structure of this kind which includes, as a part of the mounting or draft means for the tool, per se, a blade element which enters the ground at a trailing angle such that it will slice or cut its way through roots, plants, or trash and prevent the accumulation of such matter ahead of the tool as usually occurs. A further object is to provide a mechanism of this kind in which the tool mounting or draft member has a rudder-like action in the ground such as to guide the tool in the horizontal plane. Still a further object is to provide a tool and supporting mechanism by which the tools, when used in gangs, may be steered in connection with the tractor to maintain proper relation to the crop being worked and with depth adjustment means to positively control the working depth of the tools.

These and other more detailed and specific objects will be disclosed in the course of the following specification, reference being had to the accompanying drawing, in which—

Figure 1:
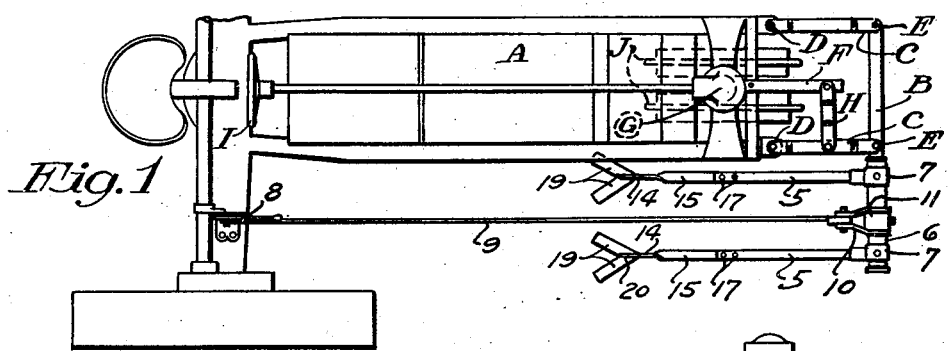
Fig. 1 is a fragmentary plan view of a tractor mounted cultivator mechanism embodying my invention.
Figure 2:
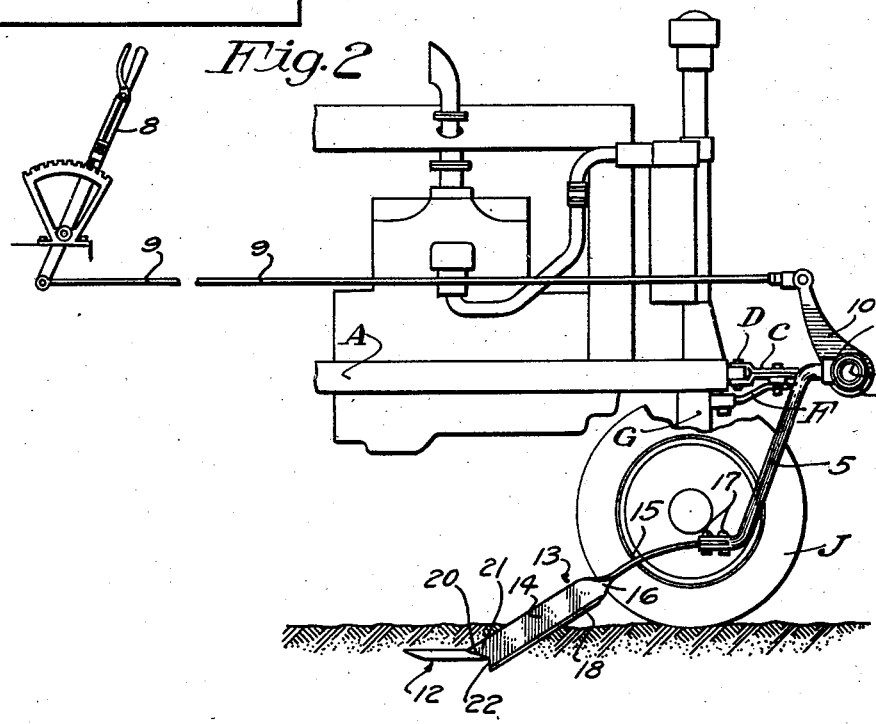
Fig. 2 is an enlarged fragmentary side elevation of a forward portion of the mechanism shown in Fig. 1, the tool being shown as running in the earth.
Figure 3:
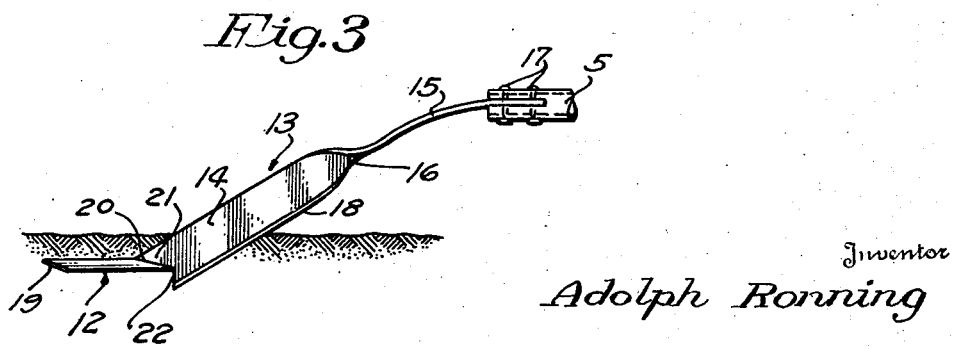
Fig. 3 is a further enlarged side elevation of the tool and mounting means alone.

This application is a division from my parent application Serial No. 226,941, filed August 26, 1938, for a Cultivator, now Patent No. 2,199,674, granted May 7, 1940.

Referring now with more particularity and by reference characters to the drawing, A represents generally a tractor of any conventional form and upon which my invention is shown mounted. For this mounting I provide a main mounting member in the form of a transverse beam B at the front of the tractor and which beam extends at each end (only one end herein shown) laterally from the tractor. Support arms C are pivoted at D on the tractor and are extended forwardly therefrom to points of pivotal connection at E with the beam to thus support said beam for transverse shifting action. Such action is brought about by an arm F secured to the vertically axised steering post G of the tractor and connected by a link H to one of the support arms C so that movement of the steering post, by means of the steering wheel I and for the purpose of steering the front wheels J of the tractor, will shift said beam transversely. The implements carried by the beam are thus shifted or steered in accordance with the steering of the tractor giving what is termed coordinated steering.

Draft members or arms 5 are connected at forward ends to the beam B to be pulled and supported thereby, said members being arranged to oscillate in a vertical plane with respect to the beam in any suitable manner. This may be carried out by provision of a sleeve 6 at each end of the beam to rotate thereon and by securing the frontal ends 7 of the draft members on the sleeve. The draft members trail rearwardly from the beam alongside the forward end of the tractor and may, of course, be adjusted transversely to vary the spacing between the respective tools carried by the members.

The draft members 5 are raised and lowered, for making depth adjustments of the tools, by means of a hand lever mechanism 8 at each side of the tractor, located at the rear thereof convenient to hand of the driver, and connected by a forwardly extending rod 9 with an arm 10 secured at 11 to each sleeve 6 and upwardly extended therefrom. By shifting the levers 8 the draft members at each side of the tractor may thus obviously be raised and lowered at the rear ends as may be desired.

The tool assemblies mounted on the draft members 5 comprise the tools or shovels 12 and the connecting or mounting members 13. Said members 13 are formed of flat spring material having rear blade members or portions 14 set vertically or edgewise with respect to the ground and forward mounting portions or spring members 15 which act as springs and which are disposed at right angles to the blades 15 by twisting the material axially through substantially ninety degrees as shown at 16. The forward ends of the spring elements 15 are secured by bolts or rivets 17 upon, or in notches in, the rear ends of the draft members 5, and these spring portions curve downwardly from these points of attachment and are tensioned to resiliently or yieldably resist any upward displacement at their rear ends.

The blades 14 are disposed in a downwardly and rearwardly trailing position so that the lower edge stands at a sharp upward and forward angle, substantially less than a right angle, with respect to the ground in order thus to facilitate both the entrance of their rear ends into the ground and to afford a cutting or slicing action such that they will cut their way through roots, plants, or other like matter. The lower, forward edges of the blades may be sharpened as shown at 18 to increase such cutting and penetrating action.

The tools or shovels 12 are herein shown as of V-shaped form having rearwardly diverging wings or sweeps 19 and the forwardly turned apices of the tools are welded or otherwise secured at 20 to overhanging tail portions 21 formed by extensions of the rear ends of the blades as clearly shown. Such mountings support the tools 12 substantially horizontally at the rear ends of the blades and in such manner that the tool will run through and in the ground in the proper position. A sharp point or fin portion 22 of the blade depends below the tools 12 forwardly thereof as shown.

The draft members 5 are shown as bent downwardly to dispose their rear ends at a position most convenient for connection to the tool mounting members 13.

In operation the blade members 14 will cut their way through the ground ahead of the tools 12 thus acting to guide said tool by a rudder-like action and also serving to slice through roots, plants, or other debris and prevent an accumulation of such matter ahead of the tools. The flexing action of the spring members 15 holds the tools to their work, but of course will allow the tools to rise and clear any obstructions which may come in the path of the blades 14. The use of gauge wheels or "floating-action" supports for the tool gangs is thus made unnecessary.

The tools are steered with the tractor by the transverse shifting of the beam B as aforesaid and proper steering of the tools is greatly facilitated by the rudder or guiding action of the blades 14 in the ground. The tools are raised and lowered and fixed at any desired level by the hand lever mechanisms 8, and may of course be lifted clear from the ground for transport purposes.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In combination, a draft device, means for raising and lowering the draft device, an earth working tool assembly comprising a flat spring blade member having a lower edge disposed at a sharp angle for entering the earth with a forwardly and downwardly slicing action, the frontal end portion of the blade member being twisted approximately ninety degrees, such frontal blade portion being attached to the draft device in a manner to yieldably support the rear portion for upward and downward movement relative to he draft device, and an earth working tool secured to the rear portion of the blade member.

2. In combination, a draft device, means for raising and lowering the draft device, a tool unit attached thereto and comprising a flat spring blade member disposed in a generally vertical fore and aft plane and having a lower edge disposed at a sharp angle with respect to the horizontal so as to enter the earth with a forwardly and downwardly slicing action, a flat spring element connecting the forward end of the member to the draft device, said spring element being rigidly connected to the blade member and disposed at substantially right angles with respect thereto so as to provide for limited vertical flexibility of the latter with respect to the draft device and independently of raising and lowering adjustments thereof, and an earth working tool secured to the rear portion of the blade member.

3. The combination with a draft device, of a tool unit comprising a flat blade member disposed in a substantially vertical fore and aft plane and having its entire lower edge disposed at a sharp angle with respect to the horizontal to enter the earth with a slicing action, a spring element extending from the forward end of the blade member and connecting the same to the draft device to provide limited vertical flexibility with respect to said draft device, and an earth working tool connected to the blade member.

4. The combination with a draft device, of a tool unit connected thereto and including a blade member disposed in a trailing position and having a lower cutting edge forwardly inclined at a sharp angle with respect to the horizontal so as to enter the ground with a slicing action, a flat spring element extending from the forward end of the blade member and connected to the draft device, the said spring element having inherent resiliency sufficient to permit limited vertical movement of the blade member, and an earth working tool on the blade member, and the said cutting edge extending downwardly to the tool.

5. In a cultivator, a draft device, a blade member formed of spring material and arranged in a generally upright trailing position with its lower edge sharply inclined for cutting into the ground, a forward portion of the blade member being connected to the draft device and disposed to yieldably resist vertical movement of the blade member, and earth working means on the rear portion of the blade member.

6. In a cultivator, a draft device, a tool mounting member formed of a length of spring material twisted intermediate its ends to provide a forwardly disposed mounting portion and rear blade portion, the said mounting portion being secured to the draft device and arched to provide yielding vertical movement of the blade portion, the said blade portion being supported in a rearwardly and downwardly trailing position with its lower edge sharply inclined to enter the earth with a slicing action, and an earth working tool on the blade portion rearwardly of the slicing edge thereof.

7. In a cultivator, a draft device, a flat spring element secured to said draft device and extended rearwardly thereform to provide limited vertical flexing motion at its rear end, a blade member extended from said rear end of the spring element and disposed in a trailing position with a lower cutting edge sharply inclined forwardly and upwardly to enter the earth with a forwardly and downwardly slicing action, and earth working means on the rear of the said blade member.

8. In a cultivator, a draft member, a spring member secured to said draft member, a blade member extending from the end of the spring member and supported thereby in a trailing position, the said blade member having a lower cutting edge disposed at a sharp forward and upward inclination to enter the earth with a downwardly and forwardly slicing action, an earth working tool on the blade member, means for raising and lowering the draft member, and the said spring member being arranged to provide limited vertical flexibility of the blade member and tool independently of the adjustment of the draft member.

9. In a cultivator, a draft member, a spring member secured to said draft member, a blade member extending from the end of the spring member and supported thereby in a trailing position, the said blade member having a lower cutting edge disposed in a sharp forwardly and upwardly inclined position to enter the earth with a downwardly and forwardly slicing action, an earth working tool on the blade member, means for adjusting the draft member vertically to control the level of the blade member and tool, and the said spring member being arranged to provide limited yieldable vertical movement of the blade member and tool at any adjusted position of the draft member.

10. In a tractor mounted cultivator, a transverse mounting member, a series of draft members connected at forward ends to the mounting member and extended rearwardly therefrom, means on the tractor for oscillating said mounting member to raise and lower the rear ends of the draft members, spring elements secured to the rear ends of the draft members, blade members extending in trailing position from the spring elements and supported thereby in rearwardly and downwardly sloping positions, the said blade members having lower cutting edges disposed at sharp angles with respect to the horizontal to enter the earth with a forwardly and downwardly slicing action, earth working tools on the blade, and the said spring elements having flexibility to provide limited vertical movement of the individual blade members and tools independently of the vertical adjustment of the draft members.

11. The combination with a tractor, of a cultivator mechanism comprising, a transverse beam, pivotal supports for the beam on the tractor, means for shifting said beam transversely in coordination with steering movements of the tractor, draft members connected to the said beam, spring elements secured to the draft members and extending rearwardly therefrom, flat blade members extending from the rear ends of the spring elements and supported thereby in a trailing position in a generally upright fore and aft plane such that their lower edges enter the ground at a sharp upward and forward inclination, and tools carried by rear end portions of the blade members.

12. The combination with a tractor having steerable front wheels, of a cultivator mechanism comprising a beam transversely extended at the front of the tractor, arms pivotally supporting the said beam for transverse shifting movement, an arm connected to the tractor for movement in accordance with steering movements of the tractor wheels and connected to the beam supporting arms to provide coordinated shifting movements of the beam, draft members connected to the beam, spring elements secured to the draft members and rearwardly extending therefrom, flat blade members extending from the rear ends of the spring elements and supported thereby at a downwardly trailing angle and generally upright fore and aft plane, the said blade members having lower edges disposed to enter the earth with a forward and downward slicing action, earth working tools mounted on the rear portions of the blade members, and the said spring elements being arranged to provide limited flexibility for individual vertical movements of the blade members and tools.

13. The combination with a tractor having steerable front wheels, of a cultivator mechanism comprising a beam transversely extending at the front of the tractor, arms pivotally supporting the said beam for transverse shifting movement, an arm connected to the tractor for movement in accordance with steering movements of the tractor wheels and connected to the beam supporting arms to provide coordinated shifting movements of the beam, draft members connected to the beam, spring elements secured to the draft members and rearwardly extending therefrom, flat blade members extending from the rear ends of the spring elements and supported thereby at a downwardly trailing angle and generally upright fore and aft plane, the said blade members having lower edges disposed to enter the earth with a forward and downward slicing action, earth working tools mounted on the rear portions of the blade members, the said spring elements being arranged to provide limited flexibility for individual vertical movements of the blade members and tools, and means for raising and lowering the draft members on the beam for adjusting the level of the tools independently of individual yieldable movements thereof.

14. In a cultivator, a draft device, a flat blade arranged in a generally edgewise trailing position behind the draft device for slicing action in the ground, a flat spring member connecting the blade and the draft device and permitting limited up and down flexible movements of the blade, a rearwardly extending tail member on the blade, and a cultivating tool secured to the said tail member to trail behind the blade.

15. In a cultivator, a draft device, an elongated flat blade disposed in edgewise trailing position behind the draft device to thereby enter the ground at its forward edge with a slicing action, a flat spring member connecting the blade to the draft device and having resiliency sufficient to permit limited up and down movement of the blade, an earth working tool secured to the rear end of the blade, and a portion of the forward edge of the blade being extended below the level of the tool.

ADOLPH RONNING.